June 21, 1966 C. H. ARNOLD 3,257,013
EARTH HANDLING VEHICLE
Filed June 13, 1963 3 Sheets-Sheet 1
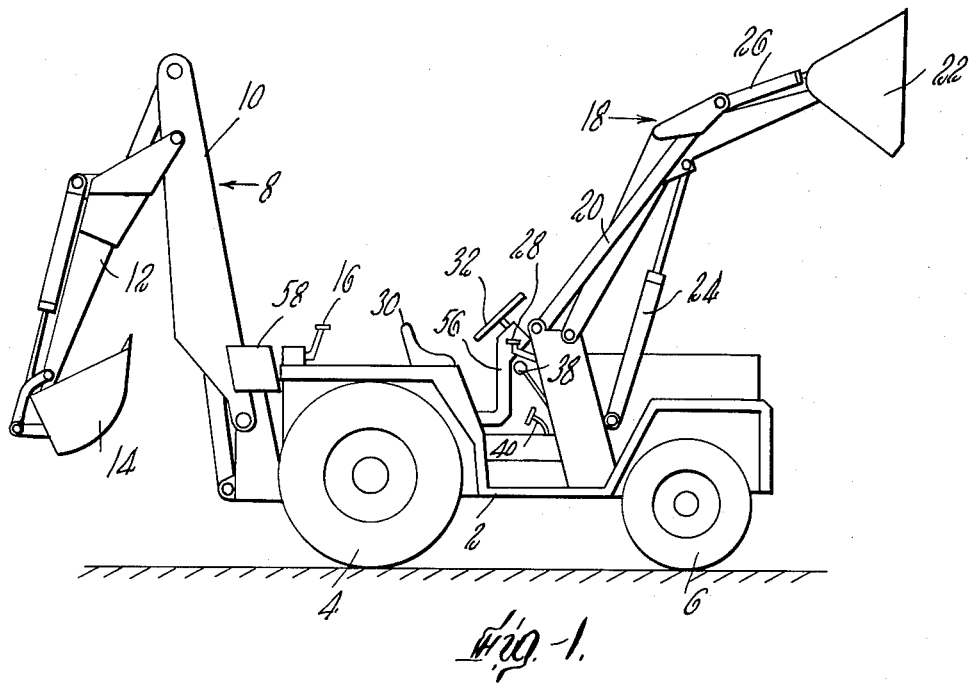

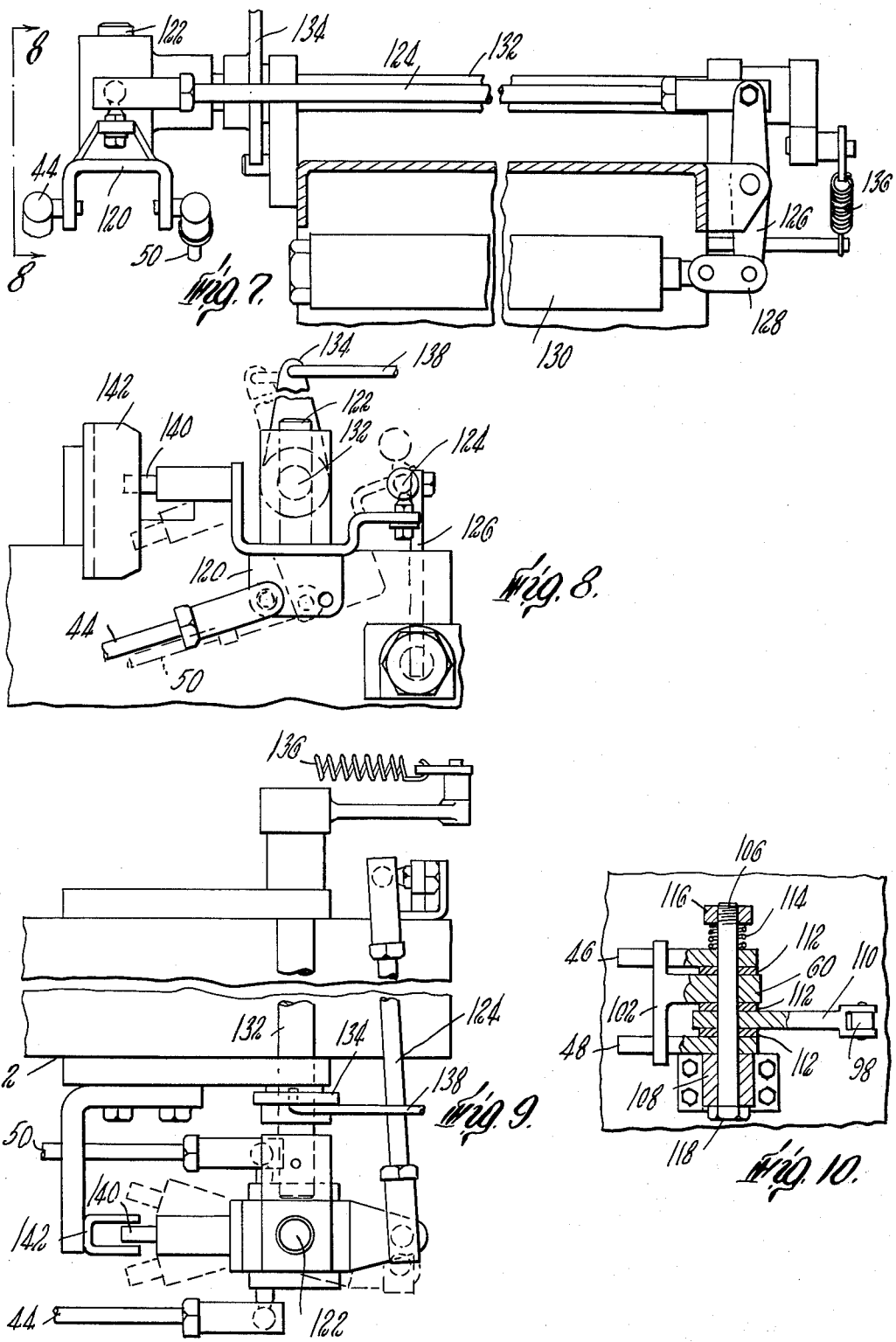

United States Patent Office 3,257,013
Patented June 21, 1966

3,257,013
EARTH HANDLING VEHICLE
Carroll H. Arnold, Westminster, Mass., assignor to Wain-Roy Corporation, Hubbardston, Mass., a corporation of Massachusetts
Filed June 13, 1963, Ser. No. 287,624
9 Claims. (Cl. 214—131)

The present invention relates to earth moving equipment and more particularly to a power operated digging and loading vehicle.

An object of the invention is to provide an improved power operated vehicle having a backhoe mounted at its rear and a loader bucket mounted at its front of improved construction for increased efficiency of operation.

A further object of the invention is to provide such a power operated vehicle having improved dual controls for operation of the vehicle forwardly for transport or use of the loader bucket or for operation of the backhoe at the rear of the vehicle and movement of the vehicle forwardly or rearwardly in connection with such backhoe operations.

A further object of the invention is to provide such a power operated vehicle having a fluid operated transmission together with an improved control arrangement for more convenient operation and performance of all the functions of the apparatus.

A further object of the invention is to provide such a vehicle having improved steering controls facilitating operation in either direction.

A further object of the invention is to provide such a vehicle having a fluid operated transmission, power steering, and a power driven source of pressure fluid for operating the backhoe and improved controls for operating the power steering, loader and backhoe.

Other and further objects, features and advantages of the invention will become apparent from the following description of an illustrative embodiment of the invention, in which description reference is made to the accompanying drawings wherein:

FIG. 1 is a side elevation of the entire vehicle;

FIG. 2 is a plan view, somewhat schematic, illustrating the arrangement of the various controls with respect to the operator's seat;

FIG. 3 is a plan view, somewhat schematic, showing the driver's seat and steering control in a different position, for driving the vehicle to the rear or operating the backhoe;

FIG. 7 is a vertical sectional view on line 7—7 of FIG. 4 showing the transmission control;

FIG. 8 is a vertical sectional view taken on line 8—8 of FIG. 7;

FIG. 9 is a horizontal view of the transmission control device appearing in FIGS. 7 and 8, and FIG. 10 is a horizontal view partly in section showing the rear control pedals and a manual control associated with the same.

Figure 4:
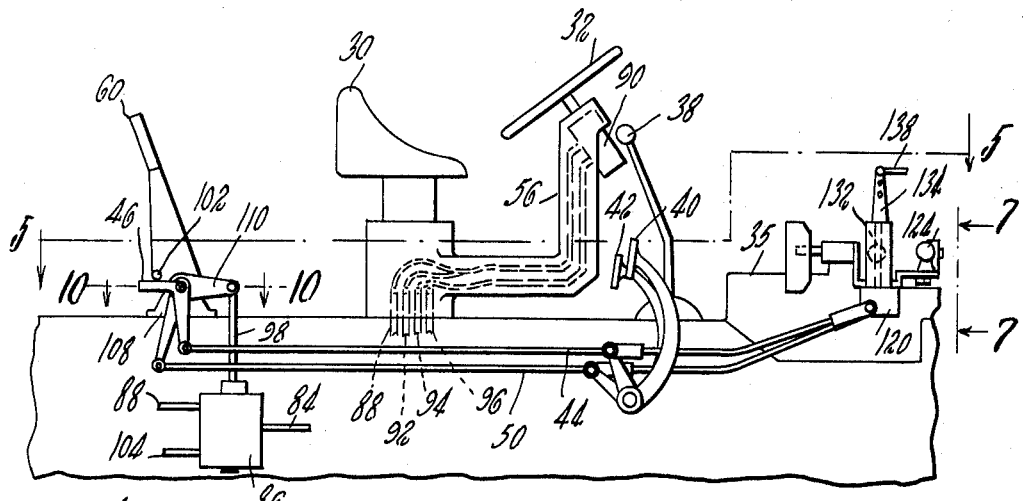
FIG. 4 is a side elevation, partly broken away and somewhat schematic.

Referring to the drawing, the illustrative apparatus comprises a vehicle chassis 2 having a pair of rear wheels 4 and a pair of steerable front wheels 6 supporting the chassis for movement over the ground. At the rear of the chassis is mounted a conventional pressure fluid operated backhoe 8 including a boom 10 adapted to be raised and lowered and swung from side to side, a dipper stick 12 mounted for swinging movement on the boom and a backhoe bucket 14 mounted for swinging movement on the dipper stick 12. The various movements of the backhoe parts are produced by pressure fluid operated cylinders and pistons under the control of a set of manual controls 16 located in convenient position at the rear of the vehicle.

At the front of the vehicle is a loader 18 including lifting arms 20, a bucket 22 and pressure fluid operated cylinders 24 and 26 for respectively lifting the bucket and manipulating it on its supporting structure. Controls 28 for manually controlling the operation of the loader bucket are conveniently located at the right of the dashboard, in front of the operator's seat 30 and the steering wheel 32.

The operator's seat 30 is mounted for rotation on a vertical axis for movement from a position as shown in FIG. 2 for use when the vehicle is to be driven forwardly for transport, or the loader 18 is to be used, to the position shown in FIG. 3 in which the seat faces rearwardly for use when the backhoe is to be operated and the vehicle moved forwardly or rearwardly in connection with the backhoe operation.

Figure 5:
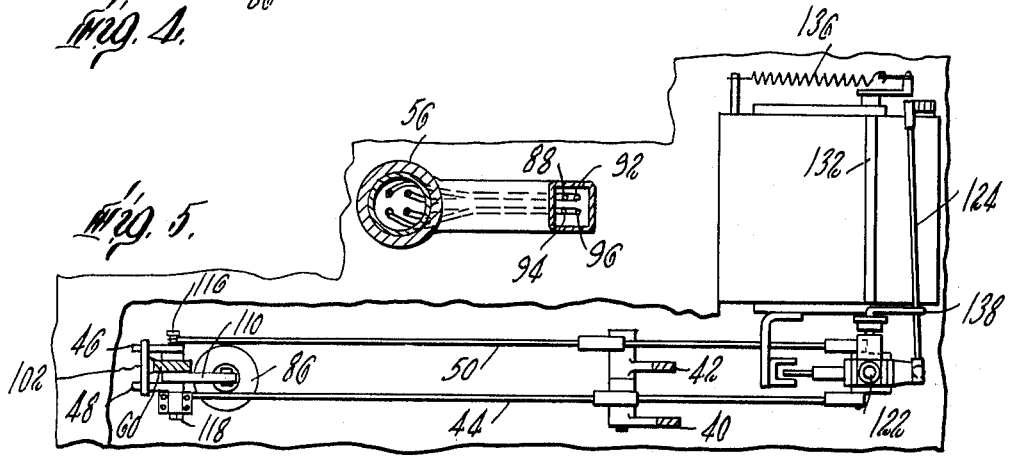
FIG. 5 is a horizontal sectional view taken on line 5—5 of FIG. 4.

The vehicle is provided with an engine 34 located beneath the hood. A source of pressure fluid 36, FIG. 6, to be described in more detail hereinafter, is driven from the engine to supply pressure fluid for operating the various operating cylinders of the backhoe and loader bucket. Further, the engine 34 is connected to the vehicle wheels through a 4-speed gear box controlled by a gear shift lever 38, and a conventional fluid operated drive 35, of a type shown in Patent 2,887,199, comprising a reversing clutch and torque converter. The fluid operated drive is adapted to be controlled by a pair of front foot pedals comprising the forward pedal 40 and the reverse pedal 42 located on the floor in front of the driver's seat. Pedal 40 is interconnected through a push rod 44, FIG. 4, to a forward pedal 48 (FIG. 5) located on the floor at the rear of the driver's seat. A pedal 46 located beside the pedal 48 is interconnected through push rod 50 with the reverse pedal 42. Thus the vehicle can conveniently be driven forwardly or backwardly in either position of the operator's seat 30, that is with the operator facing forwardly or rearwardly, the steering wheel 32 being swung to the position of FIG. 3 for rearward operation.

When pedal 40 (or pedal 48) is depressed, the first short part of its travel moves a hydraulic fluid control valve to set the transmission for forward operation. Further depression of the pedal progressively accelerates the engine to drive the vehicle forwardly. When pedal 42 (or pedal 46) is depressed, the first short portion of its travel sets said control valve into the reverse position and further depression of the pedal accelerates the engine to drive the vehicle in reverse. In either case, the appropriate speed ratio of the mechanical gear box will be selected by use of the shift lever 38. Simultaneous depression of both pedals 40 and 42 (or pedals 46,48) sets the transmission control valve in the neutral position so that the vehicle is not driven. Further depression of both pedals simultaneously accelerates the engine to increase the speed of the source of pressure fluid 36 to provide more power for operation of the loader 22 or the backhoe 8, depending upon which piece of equipment is then in use.

A brake pedal 52 located on the floor in front of the operator's seat 30 operates a hydraulic brake system to brake the wheels 4 and 6. A similar brake pedal 54 located on the floor at the rear of the operator's seat 30 is coupled mechanically to the pedal 52 so that depression of either pedal operates the brakes. The brakes can be locked in braking condition by a pushbutton-operated solenoid, the pushbutton being, if desired, conveniently located on the steering column 56. The steering column 56 is rotatable about a vertical axis from the position of FIG. 2 to the position of FIG. 3, and vice-versa, and can be locked in either position. Thus all of the functions of the apparatus, including operation of the backhoe 8, the loader 18 or operation of the vehicle over the ground either forwardly or rearwardly and braking of the vehicle can conveniently be performed by the operator sitting in the seat 30, either facing forwardly as in FIG. 2 or to the rear as in FIG. 3.

The vehicle is provided with conventional stabilizer arms 58, FIG. 1, adapted to be swung downwardly by pressure fluid operated cylinders to engage pads at their lower ends with the ground when the backhoe is to be operated to more securely stabilize the vehicle. This action transfers a part or substantially all of the weight of the vehicle to the front wheels. The arrangement for locking the brakes as described provides more stable conditioning of the vehicle for backhoe work when the stabilizers are down.

A hand lever 60 is provided adjacent the rear pair of pedals 46, 48 for simultaneously depressing these pedals and holding them down when the backhoe is to be operated, to place the transmission in neutral and to accelerate the engine to provide adequate power for backhoe operation.

A pair of steering cylinders 62, 64 are appropriately mounted on the chassis to provide power steering for the vehicle.

Figure 6:
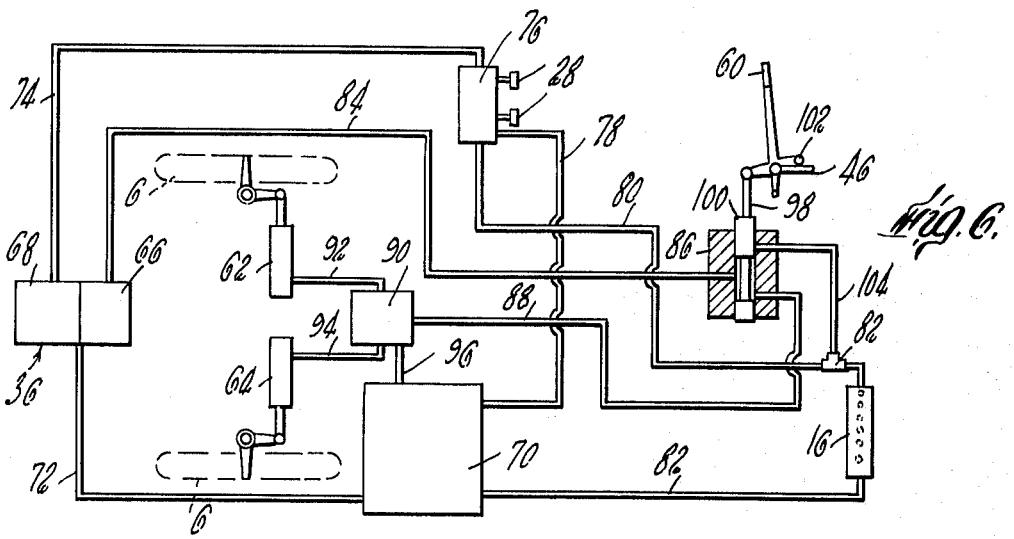
FIG. 6 is a diagrammatic showing of the pressure fluid hydraulic system.

Referring now particularly to FIG. 6, the pressure fluid hydraulic system for operating the backhoe 8, loader 18, and the steering cylinders 62, 64 will be described. The source of pressure fluid 36, driven by the engine, comprises a relatively lower volume variable delivery pump 66 and a higher volume variable delivery pump 68 mounted on a common shaft to be driven in tandem by the engine. The pumps 66, 68 take hydraulic fluid from a reservoir 70 through a common intake conduit 72. The higher volume pump 68 delivers through a conduit 74 to a loader control valve 76 which is operated by the manual controls 28. When the loader 18 is in operation, pressure fluid is delivered to it by the valve 76 by operation of the controls 28 as desired and is returned from the loader operating cylinders 24, 26 and discharged through valve 76 and conduit 78 to the reservoir 70. The capacity of the pump 68 alone is normally sufficient for all loader operations.

If the backhoe rather than the loader is in use, the loader controls 28 are in neutral position and the pressure fluid delivered from pump 68 through conduit 74 passes directly through the valve 76 into a conduit 80, through a T 82 and into the control 16 for the backhoe. The controls 16 are appropriately operated as desired to perform the backhoe operating functions and the hydraulic fluid discharged from the backhoe operating cylinders returns through the control 16 and is discharged through a conduit 82 to the reservoir 70.

The lower volume pump 66 delivers pressure fluid through the conduit 84 to a selector valve 86. Selector valve 86 is a 2-position valve, adapted when positioned as shown to deliver the pressure fluid from the supply conduit 84 through a line 88 to a steering control valve 90 mounted in the upper end of the steering column 56. Movement of the steering wheel 32 in one direction moves the valve 90 to deliver pressure fluid through the line 92 to steering cylinder 62, simultaneously exhausting pressure fluid from cylinder 64 through conduit 94 back through valve 90 and through conduit 96 to the reservoir 70. Movement of the steering wheel 32 in the opposite direction operates the valve 90 to deliver pressure fluid through the conduit 94 to steering cylinder 64, at the same time exhausting pressure fluid from the steering cylinder 62 through the conduit 92, valve 90 and conduit 96 to the reservoir 70. The capacity of the smaller pump 66 is fully adequate for steering purposes.

The two-position selector valve 86 is controlled by the hand lever 60 through a pull rod 98. When the hand lever 60 is moved forwardly, as shown in FIG. 6, to release the pedals 46, 48 it moves the spool 100 of valve 86 downwardly into the power steering position, as shown. The hand lever 60 is provided with a cross bar 102 arranged, when the hand lever 60 is moved to the rear, to simultaneously depress the pedals 46, 48 thus placing the transmission in neutral and accelerating the engine to speed up the pumps 66, 68 to provide a larger volume of pressure fluid as is desirable for backhoe work. Such movement of the hand lever 60 to the rear simultaneously lifts the pull rod 98, moving the spool 100 into its upper position, FIG. 6. In this upper position, the spool 100 disconnects the conduit 84 from the line 88 to the power steering cylinders and instead connects the conduit 84 to the side arm of the T 82 through conduit 104. This connection adds the pressure fluid delivered by pump 66 to the pressure fluid delivered by the pump 68 and delivers both to the backhoe control 16, thus combining the capacities of the pumps 66 and 68 to provide a larger volume of oil for operation of the backhoe. When during the backhoe operation the operator desires to move his vehicle forwardly or rearwardly, the operator shifts the hand lever 60 to its forward position, thus disconnecting the pump 66 from the backhoe and connecting it to the power steering, at the same time slowing down the engine so that the pedal 46 or the pedal 48 may safely be operated to place the vehicle in motion.

The construction of the hand lever 60 and its associated mechanism is shown in more detail in FIG. 10. The lever 60 is pivoted on a shaft 106 mounted in a bearing 108 fixed to the floor of the vehicle. The crossbar 102, as described, extends transversely of the lever in position to make engagement with the pedals 46, 48 and depress them when the lever is moved rearwardly. The pedals 46 and 48 are pivoted on the shaft 106. Also pivoted on the shaft 106 is a lever 110 extending forwardly and pivoted at its front end to the pull rod 98 for operating the selector valve 86. The lever 110 is free on shaft 106 and is not fixedly connected to the lever 60. Friction discs 112 are positioned, as shown in FIG. 10, between the pedal 46 and the lever 60, between the lever 60 and the lever 110, and between the lever 110 and the pedal 48. A compression spring 114 is disposed on the shaft 106 between the pedal 46 and a nut 116 which is threaded on the free end of shaft 106. Another nut 118 is threaded on the opposite end of the shaft 106 outside the bearing 108. When the hand lever 60 is moved from one position toward the other, the initial part of its movement causes the lever 110 to be moved with the hand lever 60 through the frictional engagement of the friction discs 112. Only a slight movement is required to fully shift the valve spool 100. Further movement of the lever 60, as may be desired to further accelecate the engine, causes slippage between the levers 60 and/or 110 and the friction discs, so that the lever 110 is not further moved.

As has been described, the foot pedals 40, 42, 46 and 48 are adapted to be operated to control the hydraulic transmission to drive the vehicle forwardly or rearwardly at different speeds. The detail of the apparatus whereby the pedals control the transmission is disclosed more particularly in FIGS. 4, 5, 7, 8, and 9. The pedals 40 and 48 when operated move the push rod 44 forwardly. Similarly, the pedals 42 and 46 when operated move the push rod 50 forwardly. The push rods 44, 50 are connected at their forward ends to opposite sides of a bracket 120 pivoted on a vertical pin 122, and when pushed rotate the bracket 120 in one direction or the other, depending upon which pedal is pushed. Such rotation of bracket 120 pushes or pulls a tie rod 124 and through lever 126 and link 128 moves the spool of a transmission control valve 130 either into position to set the transmission in reverse or in the opposite direction to set the transmission in forward drive. Further movement forwardly of either push rod 44 or 50, or forward movement of both simultaneously, rocks the bracket 120 about a horizontal axis and rotates the horizontal shaft 132 to oscillate the arm 134 against the action of the spring 136. The arm 134 is connected at its upper end to the throttle operating rod 138. Thus continued depression of either pedal 40 or 42 (or pedal 48 or 46), beyond the slight distance required to set the transmission for forward or reverse, serves to open the engine throttle. Similarly, depression of both pedal 40 and 42 (or 46 or 48) moves both push rods 44 and 50 forward simultaneously to rock the bracket 120 about the horizontal axis of shaft 132 to open the throttle, but does not rotate the bracket 120 about the vertical axis of the pin 122 and thus leaves the spool of valve 130 in its central position, setting the transmission in neutral. The bracket 120 carries a rearwardly extending pin 140 cooperating with a U-shaped guide 142 fixed on the chassis 2. When neither of the pedals is being operated, the pin 140 lies above the bracket 142. When both pedals are pushed simultaneously causing rocking of bracket 120 about the horizontal axis without rotation about the vertical axis, the pin 140 enters into the slot between the arms of the guide 142, as appears in full line position in FIG. 9, so that the bracket 120 is maintained in its central position during further depression of the pedals, preventing shifting of the valve 130 to put the transmission into either forward or reverse during the acceleration of the engine to higher speeds caused by such further depression of the pedals. When one only of the pedals is pushed, movement of the bracket 120 about the vertical axis of pin 122 positions the pin 140 to one side or the other of the guide 142, as shown in the dotted line positions of FIG. 9, so that thereafter the bracket 120 must remain in the selected forward or reverse position, maintaining the spool of valve 140 in position setting the transmission for forward or reverse drive, thus preventing shifting of the transmission from forward to reverse during further downward movement of the pedal causing acceleration of the engine.

It will be seen from the foregoing that the invention has provided an effective power operated vehicle carrying a backhoe and a loading bucket and adapted for convenient operation of either and for operation of the vehicle over the ground. The dual control arrangement of the invention, with the associated reversible seat and adjustable steering column, permit rapid change from one type of operation to another and convenient operation and control of all of the functions of the apparatus.

I claim:

1. Power operated digging and loading apparatus comprising a vehicle chassis, forward and rear wheels, a backhoe mounted at the rear of the chassis, a loader mounted at the front of the chassis, an engine, a reversing transmission interconnecting said engine and wheels, an operator's seat on said chassis reversible to face selectively forwardly or rearwardly, a pair of front foot pedals in front of said seat for operation of said transmission depression of one said pedal driving the vehicle forwardly and depression of the other said pedal driving the vehicle rearwardly, and a pair of rear foot pedals in back of said seat for operation of said transmission to similarly drive the vehicle selectively forwardly or rearwardly.

2. Power operated digging and loading apparatus comprising a vehicle chassis, forward and rear wheels, a backhoe mounted at the rear of the chassis, a loader mounted at the front of the chassis, an engine, a reversing transmission interconnecting said engine and wheels, an operator's seat reversible to face selectively forwardly or rearwardly, a steering column adjacent said seat connected to certain of said wheels to steer the same and movable with respect to said seat from a position for use when the seat is facing forwardly to a different position with respect to said seat for use when the seat is facing rearwardly, a pair of front foot pedals in front of said seat for operation of said transmission to drive the vehicle selectively forwardly or rearwardly, and a pair of rear foot pedals in back of said seat for operation of said transmission to drive the vehicle selectively forwardly or rearwardly.

3. Power operated digging and loading apparatus comprising a vehicle chassis, front and rear wheels, a pressure fluid operated backhoe mounted at the rear of the chassis, a loader mounted at the front of the chassis, an engine, a source of pressure fluid for operating said backhoe driven by said engine, a reversing transmission interconnecting said engine and wheels, an operator's seat reversible to face selectively forwardly or rearwardly, a steering column adjacent said seat and movable from a position for use when the seat is facing forwardly to a different position for use when the seat is facing rearwardly, a pair of front foot pedals in front of said seat for operation of said transmission to drive the vehicle selectively forwardly or rearwardly, and a pair of rear foot pedals in back of said seat connected to said transmission to drive the vehicle forwardly when one pedal is depressed, to drive the vehicle rearwardly when the other pedal is depressed, and to disconnect the engine from the wheels and accelerate the engine when both pedals are simultaneously depressed, and a hand lever adjacent said rear foot pedals adapted to be moved to depress said pedals simultaneously and hold them in selected depressed position.

4. The apparatus of claim 3 further including a valve operated by said hand lever for controlling application of said pressure fluid to said backhoe.

5. A power operated digging and loading apparatus comprising a vehicle chassis, wheels supporting the chassis including a pair of steerable wheels, pressure-fluid operated steering cylinders for steering said steerable wheels, a pressure fluid operated backhoe mounted at the rear of said vehicle, a pressure fluid operated loader mounted at the front of said vehicle, an engine, a source of pressure fluid including a higher volume variable delivery pump and a lower volume variable delivery pump driven in tandem by said engine, a transmission connecting said engine to said wheels, a loader control valve selectively connecting said higher volume pump to said loader or to said backhoe, a selector valve selectively connecting said lower volume pump to said steering cylinders or to said backhoe, and a manually operated control for operating said selector valve.

6. The apparatus of claim 5 further including control means operable by said manually operated control to disconnect said transmission from said wheels and accelerate said engine.

7. A power operated digging and loading apparatus comprising a vehicle chassis, wheels supporting the chassis including steerable wheels, pressure-fluid operated steering cylinders for steering said steerable wheels, a pressure fluid operated backhoe mounted at the rear of said vehicle, a pressure fluid operated loader mounted at the front of said vehicle, an engine, a source of pressure fluid including a higher volume variable delivery pump and a lower volume variable delivery pump driven in tandem by said engine, a fluid transmission connecting said engine to said wheels, a pair of foot pedals located forwardly of the operator's position connected to said transmission to drive the vehicle forwardly when one pedal is depressed, to drive the vehicle rearwardly when the other pedal is depressed and to disconnect the engine from the wheels and accelerate the engine when both pedals are depressed simultaneously, and a duplicate pair of foot pedals located to the rear of the operator's position.

8. A power operated digging and loading apparatus comprising a vehicle chassis, wheels supporting the chassis including steerable wheels, pressure-fluid operated steering cylinders for steering said steerable wheels, a pressure fluid operated backhoe mounted at the rear of said vehicle, a pressure fluid operated loader mounted at the front of said vehicle, an engine, a source of pressure fluid including a higher volume variable delivery pump and a lower volume variable delivery pump driven in tandem by said engine, a transmission connecting said engine to said wheels, a pair of foot pedals connected to said transmission to drive the vehicle forwardly when one pedal is depressed, to drive the vehicle rearwardly when the other pedal is depressed and to disconnect the engine from the wheels and accelerate the engine when both pedals are depressed simultaneously, a loader control valve selectively connecting said higher volume pump to said loader or to said backhoe, a selector valve selectively connecting said lower volume pump to said steering cylinders or to said backhoe, and a hand lever adjacent said pedals for depressing both pedals simultaneously and simultaneously operating said selector valve to connect said lower volume pump to said backhoe.

9. A power operated digging and loading apparatus comprising a vehicle chassis, wheels supporting the chassis including a pair of steerable wheels, pressure-fluid operated steering cylinders for steering said steerable wheels, a pressure fluid operated backhoe mounted at the rear of said vehicle, a pressure fluid operated loader mounted at the front of said vehicle, an engine, a source of pressure fluid including a higher volume variable delivery pump and a lower volume variable delivery pump driven in tandem by said engine, a transmission connecting said engine to said wheels, a pair of foot pedals connected to said transmission to drive the vehicle forwardly when one pedal is depressed, to drive the vehicle rearwardly when the other pedal is depressed and to disconnect the engine from the wheels and accelerate the engine when both pedals are depressed simultaneously, a loader control valve selectively connecting said higher volume pump to said loader or to said backhoe, a selector valve selectively connecting said lower volume pump to said steering cylinder or to said backhoe, a hand lever adjacent said pedals for depressing both pedals simultaneously and simultaneously operating said selector valve to connect said lower volume pump to said backhoe, an operator's seat movable to face selectively forwardly or rearwardly, a steering column supported on said chassis adjacent said seat and movable from a position for use when said seat is facing forwardly to another position for use when said seat is facing rearwardly, a manually operable pressure fluid control valve on said steering column for controlling application of pressure fluid to said steering cylinders, and pressure fluid conduits interconnecting said valve and said steering cylinders.

References Cited by the Examiner

UNITED STATES PATENTS

| | | | |
|---|---|---|---|
| 2,127,347 | 8/1938 | Tinker. | |
| 2,182,102 | 12/1939 | Tinker. | |
| 2,603,303 | 7/1952 | Atlung | 180—77 |
| 2,607,432 | 8/1952 | Lommel. | |
| 2,846,094 | 8/1958 | Pilch | 214—131 |
| 3,039,553 | 6/1962 | Van Der Lely, et al. | 180—77 |
| 3,085,644 | 4/1963 | Van Der Lely | 180—77 |
| 3,095,990 | 7/1963 | Granryd | 214—140 |
| 3,108,701 | 10/1963 | Hodgson | 214—140 |

FOREIGN PATENTS

| | | |
|---|---|---|
| 1,057,583 | 10/1953 | France. |

HUGO O. SCHULTZ, *Primary Examiner.*